United States Patent [19]
Groves

[11] 3,822,544
[45] July 9, 1974

[54] HYDRAULIC TIMING DEVICE

[76] Inventor: Thomas Conrad Groves, Box 171-A, R.D. 3, Reynoldsville, Pa. 15851

[22] Filed: Aug. 3, 1972

[21] Appl. No.: 277,513

[52] U.S. Cl. ............................... 58/2, 58/144
[51] Int. Cl. ..................... G04b 4/00, G04f 1/06
[58] Field of Search ................................ 58/144

[56] References Cited
UNITED STATES PATENTS

| | | | |
|---|---|---|---|
| 444,506 | 1/1891 | Robinson | 58/144 X |
| 1,443,573 | 1/1923 | Hinkley | 58/1 R |
| 2,847,067 | 8/1958 | Brewer | 58/144 X |
| 3,533,229 | 10/1970 | Liljequist | 58/144 |
| 3,563,024 | 2/1971 | Breed | 58/2 |

Primary Examiner—Richard B. Wilkinson
Assistant Examiner—Edith Simmons Jackmon
Attorney, Agent, or Firm—Imirie and Smiley

[57] ABSTRACT

The invention consists of a time measuring device, the operation of which is based on fluid resistance slowing and regulating the motion of a material under force in such a manner that the distance which the material travels can be used as an accurate indication of the amount of time which has elapsed since the motion of that material began.

8 Claims, 3 Drawing Figures

PATENTED JUL 9 1974 3,822,544

HYDRAULIC TIMING DEVICE

SUMMARY OF THE INVENTION

A timing device according to the invention comprises a piston slidably mounted in substantially fluid tight relation in a fluid filled cylinder with a scale divided into increments of time cooperative with the cylinder and piston to indicate relative movement therebetween. A by-pass flow tube or passageway is in communication with the cylinder on the opposite sides of the piston and fluid flow control means associated with said by-pass regulates the rate of piston movement in said cylinder.

DETAILED DESCRIPTION OF THE INVENTION

Figure 1:
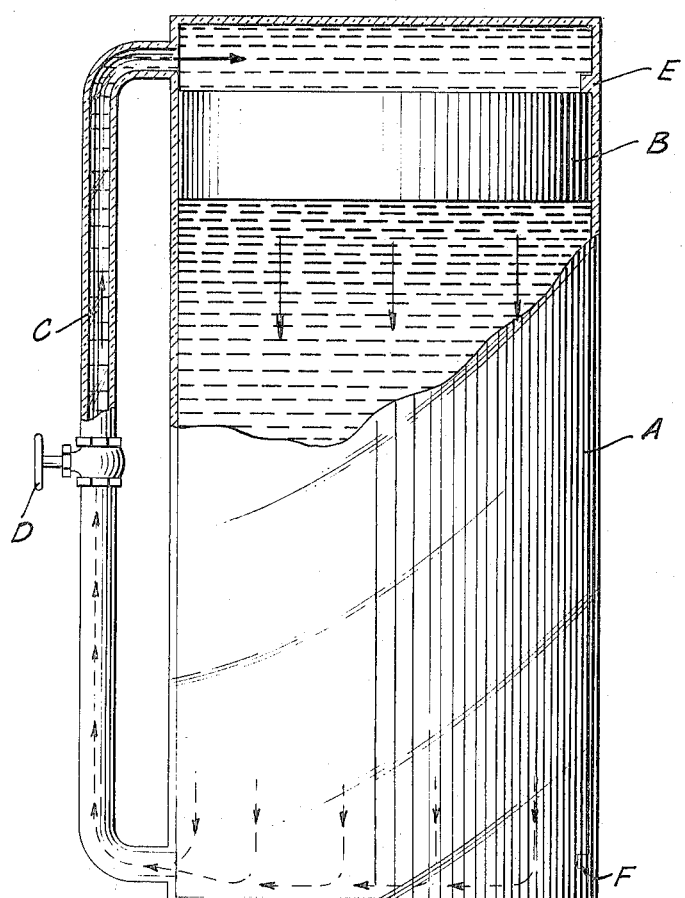
FIG. 1 is an elevational view, partially in section, of a hydraulic timing device according to the invention.
Figure 2:
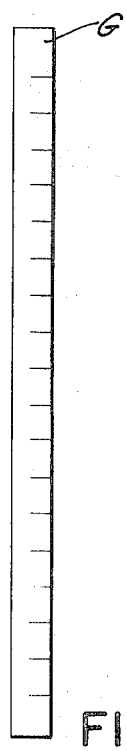
FIG. 2 is an elevational view of a scale for cooperative use according to the invention.

The drawing, FIG. 1, represents a cross section view of the Hydraulic Clock. A, is the hollow transparent cylinder. B, the dark shaded area, is the piston which slides up and down the cylinder. C, is the flow tube through which oil flows from the area below the piston to the area above the piston. D, is the adjustable valve which controls this flow. E and F, are ridges protruding into the cylinder for the purpose of providing stopping points for the piston. G, is the time scale against which the position of the falling piston is compared in order to accurately read the time which elapsed since the descent of the piston began. The entire clock, including the flow tube, is filled with oil and sealed.

The Hydraulic Clock or timing device (see FIG. 1) consists of A, a hollow transparent cylinder, sealed at both ends, filled with oil and containing a metal piston, B, which fits the cylinder wall closely enough to prevent any appreciable oil leakage between itself and the cylinder wall. One hole in an extreme end of the cylinder is connected to another hole in the extreme opposite end of the cylinder by means of a flow tube, C, which is fitted with an adjustable valve, D. The inside diameter of the cylinder is uniform and smooth except for two ridges, E and F, which function as stopping points for the moving piston.

The cylinder is set in an upright position with the piston in its uppermost position as in FIG. 1. In this position, the piston is resting on the column of oil underneath it and exerts pressure on the column of oil by virtue of its weight.

If the valve is closed, the piston will be unable to fall because of its inability to displace the column of oil underneath itself. When the valve is opened, the piston will descend, forcing the column of oil underneath it through the opening in the bottom end of the cylinder, up the flow tube, through the valve opening and into the area of the cylinder that is above the piston. The rate of descent of the piston can be varied by adjusting the valve opening. Increasing the valve opening to a larger factor will lower the fluid flow resistance of the unit enabling the piston to descend at a greater velocity. Conversely, decreasing the valve opening will increase the fluid flow resistance of the unit and will lower the velocity of descent of the piston. In this manner the descent velocity of the piston can be smoothly lowered to any value desired. Once the proper valve opening is selected and fixed, the fluid flow resistance of the entire apparatus is fixed. Because the weight of the piston is fixed, the pressure it exerts on the column of oil underneath it is also a fixed factor. The weight of the column of oil under the piston and the weight of the column of oil above the piston will always add up to a constant amount. Thus, the pressure due to the weight of the oil itself will not vary as the piston descends. Since the combined pressure of the piston and the column of oil is fixed at all times, the descent velocity of the piston, no matter how slow, will remain constant at whatever valve setting selected until it comes to rest against the ridge situated near the bottom end of the cylinder.

This constant, slow, uniform velocity of descent of the piston enables every location of the piston on the way to the bottom end of the cylinder to be an accurate indication of the time which has elapsed since the descent of that piston began. For example, if the valve is adjusted so that it takes 24 hours for the piston to descend the full length of its allowable travel from the top to the bottom of the cylinder, then each one twenty-fourth of that distance of descent can be marked on a scale to represent 1 hour of time, and each twelfth of that distance can be divided into 12 divisions which will represent 5 minute intervals, etc. When the piston has reached the bottom of the cylinder, the timing process can be started again by inverting the clock.

If the clock is intended to function as an electrical or fluid switching device, the piston, by virtue of its weight, momentum or conductivity can function as a tripping device which activates or inactivates whatever electrical circuits or switches lie in or along its path of travel. The type of these switches as well as their location is dictated by the function they are intended to perform.

Not all designs of the clock may necessitate the use of a transparent cylinder. Any substance, whether gaseous, liquid, or solid, which has fluid properties may be substituted for oil in a device of this type. Any path, adjustable or not, which allows fluid to flow out of the path of the piston's direction of travel may be used in place of or in conjunction with an external flow tube. More than one flow tube may be utilized if desired. Any substance, whatever is suitable, may be used as a piston. The piston may be driven by magnetic force, if it is composed of a material such as iron which is attracted to an electromagnet. Magnetisum, however, will not exert as constant a force on the piston as gravity does. The magnetic attraction between the piston and the electromagnet will increase as the distance between the two decreases.

Figure 3:
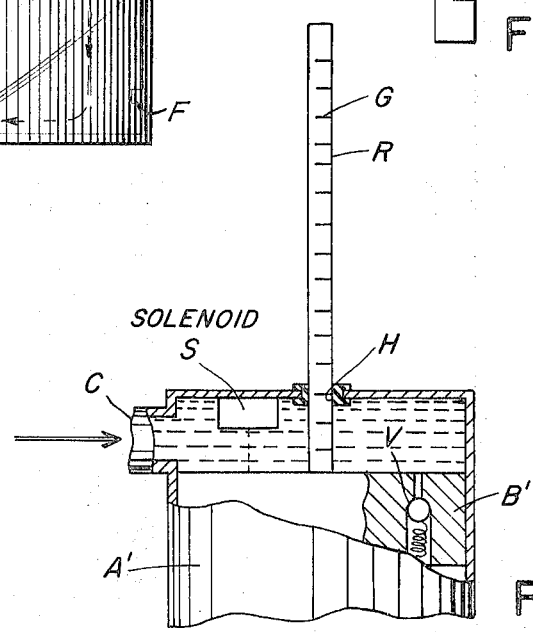
FIG. 3 is a fragmentary view similar to FIG. 1 of a modification.

In situations where it is not practical to turn the clock upside down, as shown in FIG. 3, the piston B' may be pulled to the top of the cylinder A' by means of a verticle rod R which is attached to it and which extends out of a hole H in the top of the cylinder. A time scale G etched on the rod indicates how far up the piston must be pulled in order to provide for a specific time delay. For example, if the piston's length of travel from the top of the cylinder to the bottom of the cylinder is 6 inches and if the piston descends at the fixed rate of one inch per 5 minutes, the verticle connecting rod will have a time scale 6 inches long on it corresponding to 5 minutes for every inch of its length. A one-way valve located in a separate flow channel will allow the piston to be quickly pulled in an upward direction and will close as soon as the piston begins its descent. This will provide the convenience of a quick reset time.

In situations where it is not convenient to manually reset the clock, an electromagnetic solenoid S, located either inside or outside the cylinder can be used to pull the piston to its upper position by means of attracting an iron rod I, vertically attached to the piston, or by means of attracting the piston itself, if the piston is composed of a material which is attracted by an electromagnetic field.

I claim:

1. A hydraulic timing device comprising:
   a fluid filled cylinder;
   a piston having opposite sides and slidably mounted in said cylinder in substantially fluid tight relation therewith to preclude fluid passage therebetween;
   a scale divided into increments of time and cooperatively disposed relative to said cylinder and piston to indicate movement of said piston relative to said cylinder;
   by-pass fluid flow means in communication with said cylinder on said opposite sides of said piston to transfer fluid from one side to the other of said piston and thereby enable movement of said piston along said cylinder, and
   fluid flow control means cooperative with said by-pass means to regulate fluid flow therethrough and establish the rate of movement of said piston along said cylinder.

2. A timing device according to claim 1 wherein said cylinder is vertically disposed and said piston is movable by gravity.

3. A timing device according to claim 2 wherein at least a portion of the cylindrical wall of said cylinder is sufficiently transparent for observation of said piston therethrough, and
   said scale is disposed for cooperative indication of piston position by observation through said observation portion of said cylindrical wall.

4. A timing device according to claim 3 wherein said cylinder and by-pass means are symmetrical from end-to-end and invertable for reverse movement of said piston relative to said cylinder.

5. A timing device according to claim 1 wherein said cylinder has a hole in one end wall thereof, and
   a rod fixed with said piston and extending through said hole.

6. A timing device according to claim 5 wherein said scale is disposed on said rod.

7. A timing device according to claim 6 comprising a separate flow channel controlled by a one way valve to enable quick retraction of said piston.

8. A timing device according to claim 1 further including an electromagnetic solenoid on said cylinder to pull said piston up to an initial reset position.

* * * * *